United States Patent [19]

Suga et al.

[11] Patent Number: 5,057,949
[45] Date of Patent: Oct. 15, 1991

[54] DIGITAL MAGNETIC REPRODUCING APPARATUS WITH VARIABLE TAPE SPEED

[75] Inventors: Atsuo Suga, Katsuta; Shigemitsu Higuchi, Fujisawa; Hideo Nishijima; Kaneyuki Okamoto, both of Katsuta; Masataka Sekiya, Mito, all of Japan

[73] Assignee: Hitachi, Ltd., Tokyo, Japan

[21] Appl. No.: 421,358

[22] Filed: Oct. 13, 1989

[30] Foreign Application Priority Data

Oct. 17, 1988 [JP] Japan .................................. 63-259453

[51] Int. Cl.⁵ .............................................. G11B 5/592
[52] U.S. Cl. ..................................... 360/70; 360/10.2; 360/77.16
[58] Field of Search ................. 360/10.2, 77.13, 77.16, 360/70, 71

[56] References Cited

U.S. PATENT DOCUMENTS

| | | | |
|---|---|---|---|
| 4,794,472 | 12/1988 | Doyama | 360/10.2 |
| 4,914,531 | 4/1990 | Kaaden et al. | 360/70 |
| 4,935,827 | 6/1990 | Oldershaw et al. | 360/10.2 |
| 4,954,902 | 9/1990 | Furuhata et al. | 360/10.2 |
| 5,008,763 | 4/1991 | Horino | 360/70 |

*Primary Examiner*—Aristotelis M. Psitos
*Assistant Examiner*—David L. Robertson
*Attorney, Agent, or Firm*—Antonelli, Terry, Stout & Kraus

[57] ABSTRACT

A magnetic recording and reproducing apparatus having a construction in which a digital signal including index signals recorded on a magnetic tape is reproduced and rotary magnetic heads are movable. The digital signal is reproduced by digital signal reproducing means including the rotary magnetic heads. A particular index signal among the index signals is detected by index signal detecting means. Further, the timing for reproducing the particular index signal is detected by timing detecting means. The rotary magnetic heads are moved and deviated in the direction of the rotary shaft of the rotary cylinder by rotary magnetic head position deviating means. Tape speed detecting means compares a reproduction clock with a reference clock and outputs a tape speed signal. First rotary magnetic head position deviation control means forms a control input for the rotary magnetic head position deviating means on the basis of the tape speed signal. Second rotary magnetic head position deviation control means forms the control input for the rotary magnetic head position deviating means on the basis of an output signal of the timing detecting means.

16 Claims, 4 Drawing Sheets

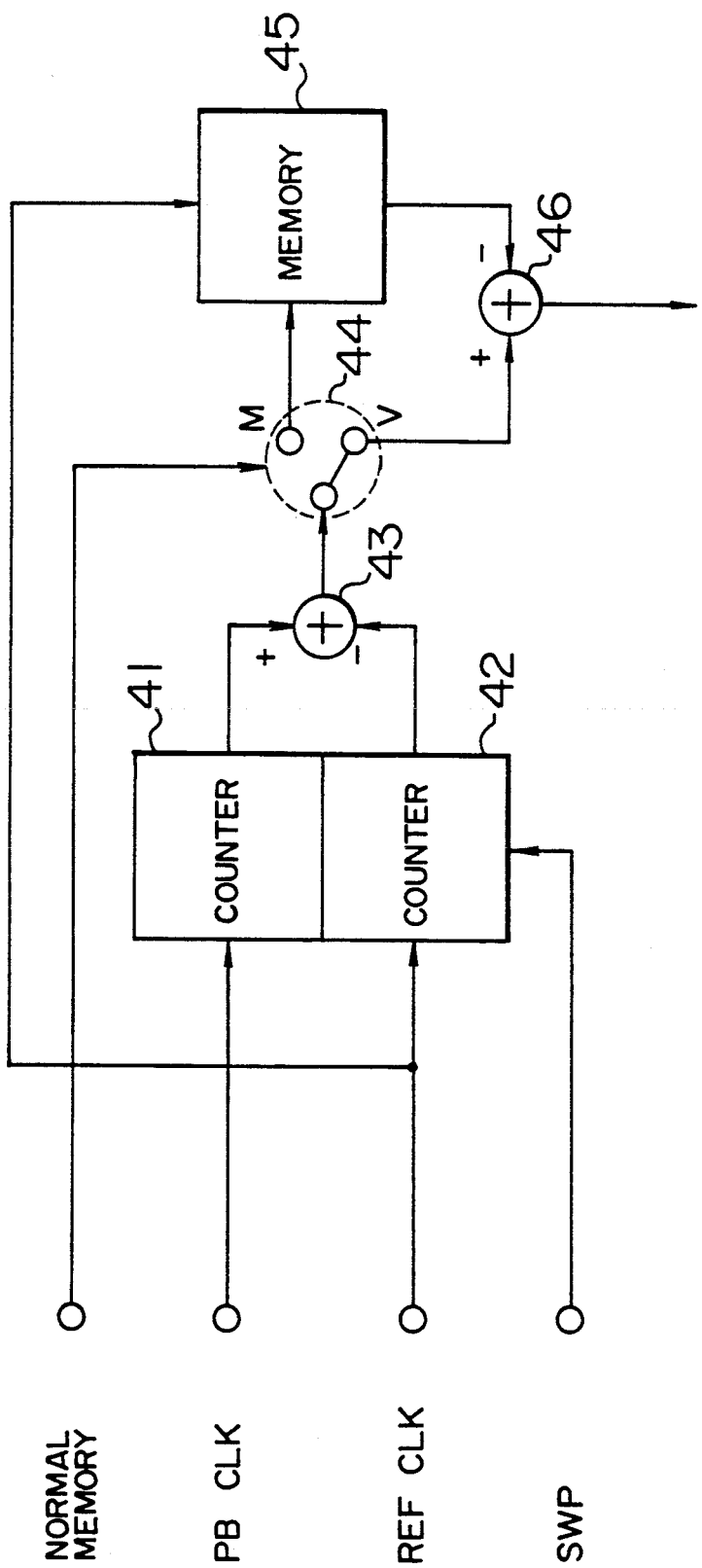

DIGITAL MAGNETIC REPRODUCING APPARATUS WITH VARIABLE TAPE SPEED

BACKGROUND OF THE INVENTION

The present invention relates to a magnetic recording and reproducing apparatus such as a video tape recorder (hereinafter, referred to as a VTR) for recording or reproducing a signal to/from a magnetic tape with a rotary magnetic head or the like. The invention particularly relates to a construction of a variable speed reproducing signal processing section in a digital type magnetic recording and reproducing apparatus such as a digital type VTR for recording or reproducing a digital signal or the like.

Hitherto, in an analog VTR, there has been proposed a construction (hereinafter, referred to as a movable head type) in which in a variable speed reproducing mode, that is, in a mode to reproduce a signal in a state in which a magnetic tape is moved at a running speed different from a standard speed, a rotary magnetic head for signal reproduction is controlled in a rotary shaft direction on a rotary cylinder and is moved and deviated by a micro amount, thereby allowing the signal reproducing rotary magnetic head to be always correctly scanned on a video signal track. According to the construction, the signal reproducing rotary magnetic head is not scanned in a state in which the head rides over a plurality of video signal tracks. Therefore, no noise bar is generated on a reproducing screen such as a screen of a television receiver or the like and what is called a noiseless variable speed reproduction image is obtained. A piezoelectric element or the like is used as means for moving and deviating the position of the signal reproducing rotary magnetic head. In the construction using a piezoelectric element, the signal reproducing head is mounted on the piezoelectric element and a voltage which is applied to the piezoelectric element is controlled so that the position in the direction of the rotary shaft of the signal reproducing rotary magnetic head is controlled in proportion to the applied voltage. Even in the case of using another deviating element of the piezoelectric element as head movement deviating means, a construction which is almost similar to the above construction is used. The above movable head type is frequently used in, particularly, a field such as a broadcasting station in which variable speed reproduction of a high picture quality is required. In the above convential techniques, a waveform of an applied voltage to deviate the rotary magnetic head mainly comprises two kinds of signals. The first kind of signal is a signal to correct for deviation of an angle of inclination of a scanning locus of the signal reproducing rotary magnetic head to a magnetic tape from an inclination angle of a recording track as the tape speed is deviated from the ordinary standard speed due to the variable speed reproducing mode. A signal waveform in this case is a triangular wave having the same period as that of a switching signal of the head. The second kind of signal is a signal for moving the rotary magnetic head in parallel by only the track deviation amount in order to allow the rotary magnetic head to correctly scan on the track. The second signal has a waveform whose signal level is changed at the same period as that of the switching signal of the rotary magnetic head.

Several methods are at present proposed as a method of forming the applied voltage waveform. Two typical methods in the conventional analog VTR are described below. In the first method, a period of pulses in a capstan FG (Frequency Generator) signal is changed in accordance with a tape speed and a control signal recorded in the longitudinal direction of a magnetic tape are used. An example of a construction of the first method has been disclosed in, for instance, JP-B-63-19929. In the second method, a reproducing timing of a vertical sync signal and a period of a horizontal sync signal which are reproduced from a magnetic tape by a rotary magnetic head for reproduction are detected and an applied voltage waveform is produced.

According to both of the first and second methods, the tape running speed and the phase relation between the rotary magnetic head and the tape are derived from the detected information, respectively, and the applied voltage waveform to correct an angle deviation and a position deviation of the head locus is formed.

The movable head control techniques in the conventional analog VTR have been described above. Further, it is a future subject that the above techniques are applied to a digital VTR and a range in which the noiseless variable speed reproduction can be executed is further widened, and the performance is improved.

In the conventional analog type VTR, for instance, in a one-inch C-format VTR or the like, a video signal of one field is recorded onto one track. To apply the above movable head method to such a VTR in a noiseless manner, it is necessary to control the reproducing magnetic head so as to accurately scan on the video track in which one track is set to a unit. Further, in the digital VTR, if a video signal is converted into a digital signal with the high picture quality information held, an amount of information increases. Therefore, the video signal information of one field is generally divided and recorded onto a plurality of tracks. For instance, consideration will now be made with respect to a recording format in which the signal of one field has been divided and recorded onto six contiguous tracks. In such a format, in order to execute the noiseless variable speed reproduction, no only must the reproducing magnetic head be accurately scanned on one track but also the reproducing magnetic head must be controlled so as to be accurately scanned on all of the six contiguous tracks corresponding to one field.

To apply the conventional first method in which the rotary magnetic head is controlled by the control signal recorded in the longitudinal direction of the magnetic tape to the digital VTR, it is an inevitable condition to obtain the address information (information indicative of which number of track of which field) of each track from the control signal.

On the other hand, consideration will now be made with respect to the case where the conventional second method in which the rotary magnetic head is controlled by the timings for producing the reproduced horizontal and vertical sync signals is applied to the digital VTR. As mentioned above, in the digital VTR, an information amount is so large that the signal of one field must be recorded onto a plurality of tracks. Therefore, it is an effective method that data which is recorded onto a magnetic tape is reduced as little as possible while keeping the image data as it is. As one of the methods which are ordinarily used, there is a method whereby signals which appear in the video signal at predetermined periods, for instance, horizontal and vertical sync signals, a color burst signal, and the like, are not recorded onto the magnetic tape.

In the digital VTR using such a method, none of the horizontal sync signal, vertical sync signal, and the like is included in the signal reproduced from the rotary magnetic head. Therefore, in such a type of digital VTR, unless signals in place of those signals exist, the conventional type of movable head system cannot be applied. Further, since the signal of one field is recorded onto a plurality of tracks, the address information of each track must be obtained from the reproduction signal.

SUMMARY OF THE INVENTION

It is an object of the present invention to solve the above problems and to provide a digital type magnetic recording and reproducing apparatus which can execute noiseless variable speed reproduction over a wide speed range by a simple construction.

To accomplish the above object, the invention provides a magnetic recording and reproducing apparatus having a construction in which a digital signal including at least index signals recorded on a magnetic tape is reproduced and rotary magnetic heads are movable on a rotary cylinder, wherein the apparatus has any one of the following first to third fundamental constructions.

1) The first fundamental construction comprises: a) digital signal reproducing means which is constructed so as to include the rotary magnetic heads in its first stage section and reproduces a digital signal including digital video signal data, sync signals having a predetermined digital signal train, and index signals; b) rotary magnetic head position deviating means such as a piezoelectric element or the like which is fixed to the rotary cylinder and causes a deviation corresponding to a control input when the control input is given, thereby moving and deviating the rotary magnetic heads in the direction of a rotary shaft of the rotary cylinder; c) tape speed detecting means for receiving and comparing a reproduction clock which is produced by the digital signal reproducing means and a reference clock which is separately generated and has a predetermined period and for outputting a speed signal corresponding to a running speed of the magnetic tape; and d) first rotary magnetic head position deviation control means for receiving the speed signal from the tape speed detecting means and for forming and outputting a control input which is supplied to the rotary magnetic head position deviating means on the basis of the speed signal.

2) The second fundamental construction comprises: a) digital signal reproducing means which is constructed so as to include the rotary magnetic heads in its first stage section and reproduces a digital signal including digital video signal data, sync signals having a predetermined digital signal train, and index signals; b) rotary magnetic head position deviating means such as a piezoelectric element or the like which is fixed to the rotary cylinder and causes a deviation corresponding to a control input when the control input is given, thereby moving and deviating the rotary magnetic heads in the direction of a rotary shaft of the rotary cylinder; c) index signal detecting means for detecting a particular index signal among the index signals recorded in video tracks; d) timing detecting means for detecting the timing for reproducing the particular index signal by using the signal synchronized with a rotational phase of the rotary cylinder as a reference; and e) second rotary magnetic head position deviation control means for forming and outputting the control input which is supplied to the rotary magnetic head position deviating means on the basis of the timing for reproducing the particular index signal.

3) The third fundamental construction comprises: a) digital signal reproducing means which is constructed so as to include the rotary magnetic heads in its first stage section and reproduces a digital signal including digital video signal data, sync signals having a predetermined digital signal train, and index signals; b) rotary magnetic head position deviating means such as a piezoelectric element or the like which is fixed to the rotary cylinder and causes a deviation corresponding to a control input when the control input is given, thereby moving and deviating the rotary magnetic heads in the direction of a rotary shaft of the rotary cylinder; c) tape speed detecting means for receiving and comparing a reproduction clock which is produced by the digital signal reproducing means and a reference clock which is separately generated and has a predetermined period and for outputting a speed signal corresponding to a running speed of the magnetic tape; d) first rotary magnetic head position deviation control means for receiving the speed signal which is output from the tape speed detecting means and for forming and outputting the control input which is supplied to the rotary magnetic head position deviating means on the basis of the speed signal; e) index signal detecting means for detecting a particular index signal among the index signals recorded on the video tracks; f) timing detecting means for detecting the timing for reproducing the particular index signal by using the signal synchronized with a rotational phase of the rotary cylinder as a reference; and g) second rotary magnetic head position deviation control means for forming and outputting the control input which is supplied to the rotary magnetic head position deviating means on the basis of the timing for reproducing the particular index signal.

With the above construction, the digital signal is easily reproduced in a noiseless manner in correspondence to the tape speed in a wide range by a simple construction of the apparatus.

BRIEF DESCRIPTION OF THE DRAWINGS

FIG. 6 is a diagram showing a circuit block to correct tape speed information in the case of reproducing a recording tape having a different recording rate.

DESCRIPTION OF THE PREFERRED EMBODIMENT

An embodiment of the invention will be described hereinbelow with reference to the drawings.

Figure 1:
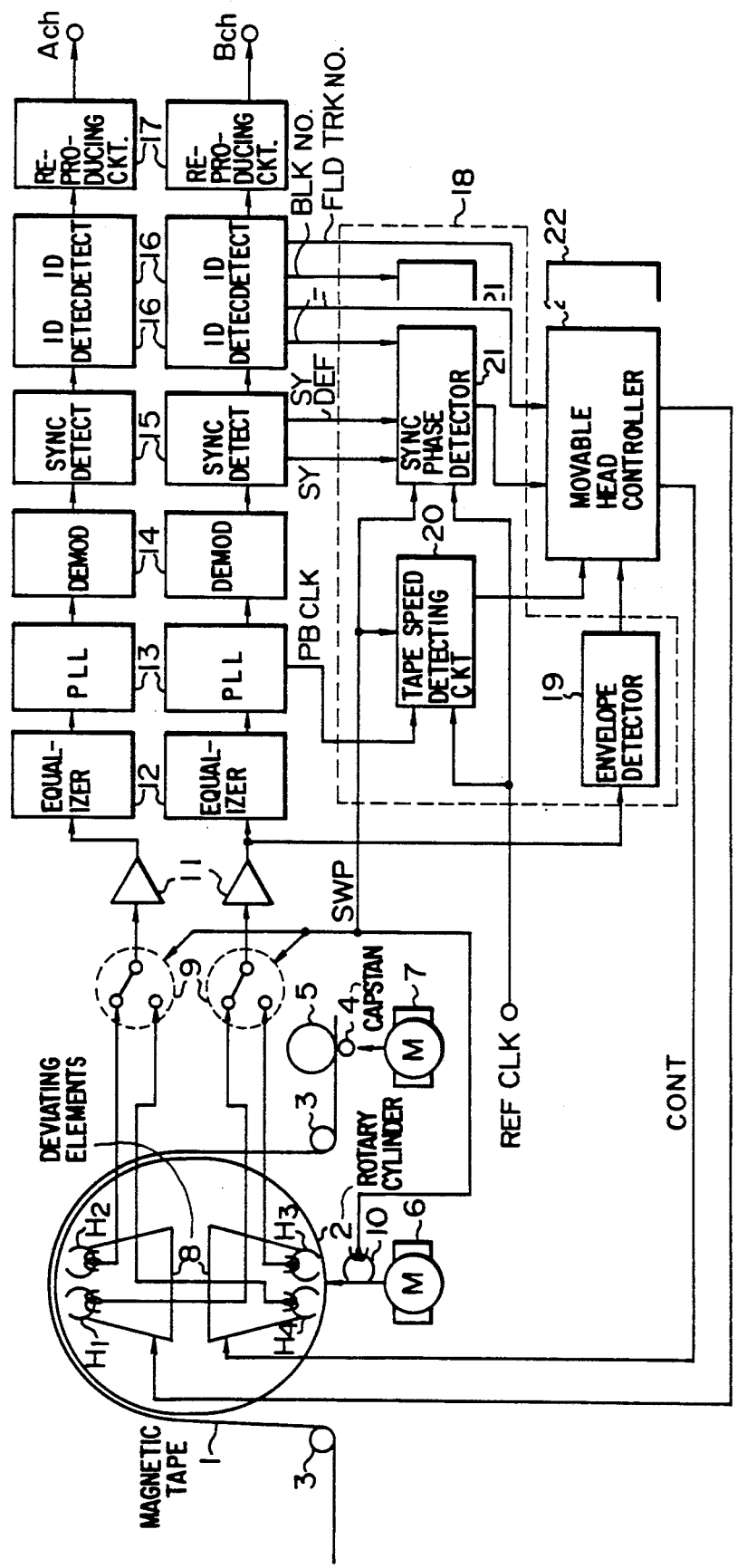
FIG. 1 is a block diagram showing an embodiment of a construction of a magnetic recording and reproducing apparatus of the invention.

FIG. 1 shows an example of a system construction of an apparatus of the invention. The construction and operation of the apparatus will now be described hereinbelow. Reference numeral 1 denotes a magnetic tape, 2 indicates a rotary cylinder, and 3 represents guide pins. The magnetic tape 1 is wrapped around the rotary cylinder 2 by the guide pins 3. Reference numeral 4 denotes a capstan and 5 indicates a pinch roller. The capstan 4 and pinch roller 5 sandwich the magnetic tape 1. The magnetic tape 1 is moved by rotating the capstan 4. Reference numeral 6 denotes a drum motor and 7 indicates a capstan motor. The drum motor 6 rotates the rotary cylinder 2 at a predetermined frequency. The capstan motor 7 rotates the capstan 4. $H_1$, $H_2$, $H_3$, and $H_4$ denote rotary magnetic heads and 8 indicates deviating elements. Gaps of the rotary magnetic heads $H_1$ and $H_2$ have opposite azimuth angles. The rotary magnetic heads $H_3$ and $H_4$ also have the same relation as that of the rotary magnetic heads $H_1$ and $H_2$. Further, the rotary magnetic heads $H_1$ and $H_3$ have the same azimuth angle. The rotary magnetic heads $H_2$ and $H_4$ also have the same azimuth angle. The rotary magnetic heads $H_1$ and $H_2$ are fixed to the front edge of the same deviating element 8. Further, the rotary magnetic heads $H_3$ and $H_4$ are fixed to the front edge of another same deviating element 8. The front edge portion of the deviating element 8 to which the two rotary magnetic heads are fixed is deviated in the axial direction of the rotary cylinder 2. Reference numeral 9 denotes change-over switches and 10 indicates a drum pulse generator. The change-over switches 9 select either one of outputs of the rotary magnetic heads $H_1$ and $H_3$ and either one of outputs of the rotary magnetic heads $H_2$ and $H_4$. When rotary cylinder 2 rotates once, the drum pulse generator 10 generates two pulses and gives output switching timings for the two sets of magnetic heads. The pulses are used as control signals of the change-over switches 9. The video signal system is divided into two channels of Ach and Bch as shown in FIG. 1. Reference numeral 11 denotes preamplifiers. The reproduction signals from the rotary magnetic heads are amplified by the preamplifiers 11. Reference numeral 12 indicates equalizers. The frequency characteristics of the head tape system are compensated by the equalizers 12. Reference numeral 13 indicates PLLs. Clocks synchronized with state changes of the reproduced signal trains are produced by the PLLs 13, so that data strobing is executed. Reference numeral 14 represents demodulating circuits. The signals which were modulated upon recording and were recorded are demodulated by the demodulating circuits 14. Reference numeral 15 indicates sync detecting circuits. The sync detecting circuits 15 detect the sync signals added in the digital signals and convert the serial digital signals into the parallel signals on the basis of the sync signals. Reference numeral 16 denotes ID detecting circuits. The ID detecting circuits 16 detect the index signals added to the digital signals. Reference numeral 17 indicates reproducing circuits. The reproducing circuits 17 produce the video signals by signal processing operations after the ID detecting circuits 16, that is, the reconstruction, error correction, and the like of the interleaved digital signals.

A recording pattern of a magnetic tape and a construction of the digital signal will now be described hereinbelow with reference to FIGS. 2 and 3.

Figure 2:
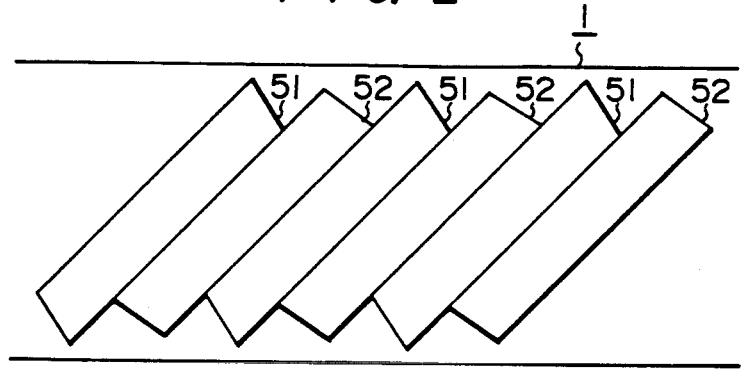
FIG. 2 is a diagram showing a recording pattern of a recorded signal on a magnetic tape.

FIG. 2 shows a recording pattern of the magnetic tape 1. Reference numerals 51 and 52 denote video tracks. The signal is reproduced from the video track 51 by being scanned by the rotary magnetic head $H_1$ or $H_3$. The signal is reproduced from the video track 52 by being scanned by the rotary magnetic head $H_2$ or $H_4$. A set of video tracks 51 and 52 are substantially simultaneously scanned by a set of rotary magnetic heads $H_1$ and $H_2$ or by a set of rotary magnetic heads $H_3$ and $H_4$. Three sets of video tracks 51 and 52 are grouped together to store the signal corresponding to one field. The signals recorded on the video tracks 51 and 52 are divided into a plurality of sync blocks having the same length. FIG. 2 shows the case where the signals are constructed of 100 sync blocks.

Figure 3:
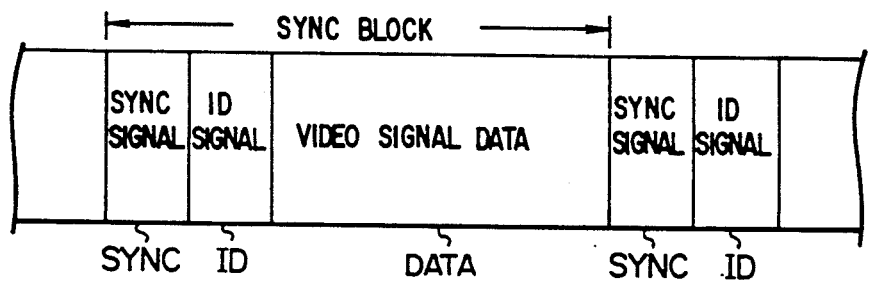
FIG. 3 is an explanatory diagram of a construction of a digital signal recorded.

FIG. 3 shows a construction of the sync block. The sync block comprises: a sync signal SYNC; an index signal (ID signal) ID; and video signal data DATA. The sync signal SYNC is located at the head of the sync block and has a predetermined signal pattern. The sync detecting circuit 15 detects the signal which coincides with the signal pattern. The index signal ID, includes: a sync block number (1 to 100) as a serial number in the track of the sync blocks; a field number (0 to 3) to which the video signal belongs; and a track number (0 to 5) as a serial number of the track in the field.

Referring again to FIG. 1, the movable head control system will now be described. Although only the movable head control system circuit of one channel is shown in FIG. 1, the actual construction has the movable head control system circuits of two channels in a manner similar to the video signal system. A circuit group 18 which is connected to the channel Bch and is surrounded by a broken line in the diagram is similarly connected to the channel Ach.

Reference numeral 19 denotes an envelope detector. In the envelope detector 19, an envelope of an output of the preamplifier 11 is produced and its level is detected, so that a tracking state of the movable head is monitored. Reference numeral 20 denotes a tape speed detecting circuit. The tape speed detecting circuit 20 compares a frequency of a reproduction clock PB CLK which is produced from the PLL 13 and a frequency of a reference clock REF CLK (for instance, a clock which is used to produce the recording signal) and obtains a tape speed from the result of the comparison. A frequency deviation amount which is detected by the tape speed detecting circuit 20 is caused by a change amount of the relative speed between the magnetic tape and the rotary cylinder. Therefore, assuming that the rotational speed of the rotary cylinder is constant, the frequency deviation amount can be made to correspond to the running speed of the magnetic tape. In the case where the magnetic tape runs at a standard speed and a count value of the reproduction clock PB CLK is stored in a memory section, the reference clock REF CLK as another hardware element as shown in FIG. 1 is unnecessary. The above point will be further described below.

Reference numeral 21 denotes a sync phase detector. The sync phase detector 21 receives a sync. detection signal SY and a defective sync signal SY DEF from the sync. detecting circuit 15, a sync block number BLK No. from the ID detecting circuit 16, a switching pulse SWP from the drum pulse generator 10, and the reference clock REF CLK. When the sync signal SYNC is detected in the reproduction digital signal by the sync detecting circuit 15, in order to produce the pulse corresponding to the detection of the sync signal SYNC, the sync detection signal SY is used. Although the sync signal SYNC inherently periodically appears, there is a case where the sync signal cannot be detected due to a factor such as a signal dropout or the like. In such a case, the sync detecting circuit 15 produces the pulses of both of the sync detection signal SY and the defective sync signal SY DEF. The sync block number BLK No. is produced by the ID detecting circuit 16 as mentioned above. Only when the sync signal SYNC is correctly detected is the specified value of the sync clock number BLK No. obtained. Otherwise, the sync block number BLK No. has an unspecified value.

Figure 4:
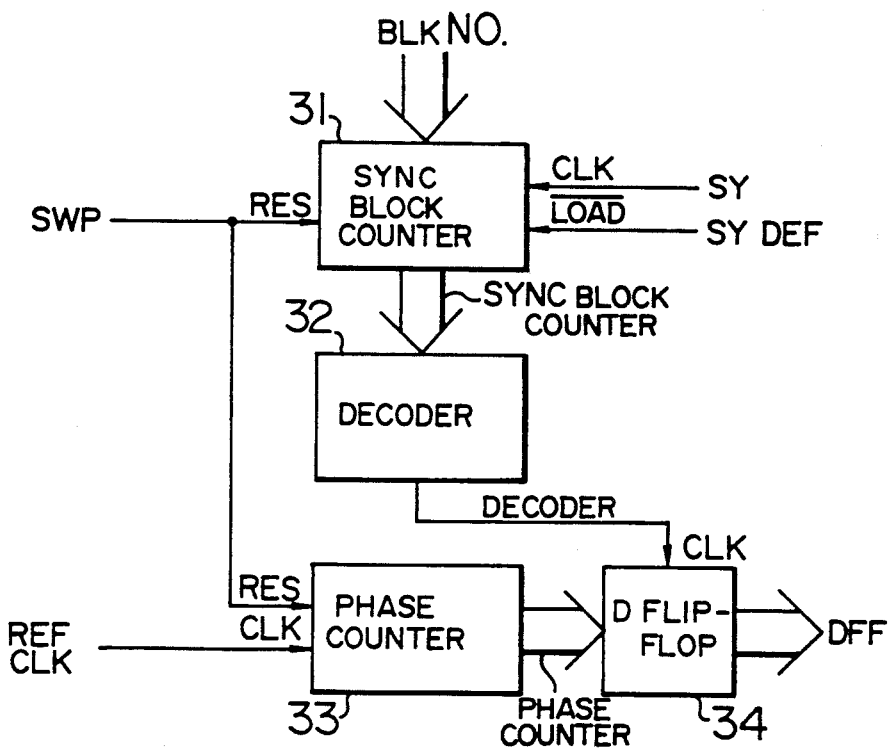
FIG. 4 is a diagram showing a circuit block to obtain the timing for producing a particular index signal (ID signal)
Figure 5:
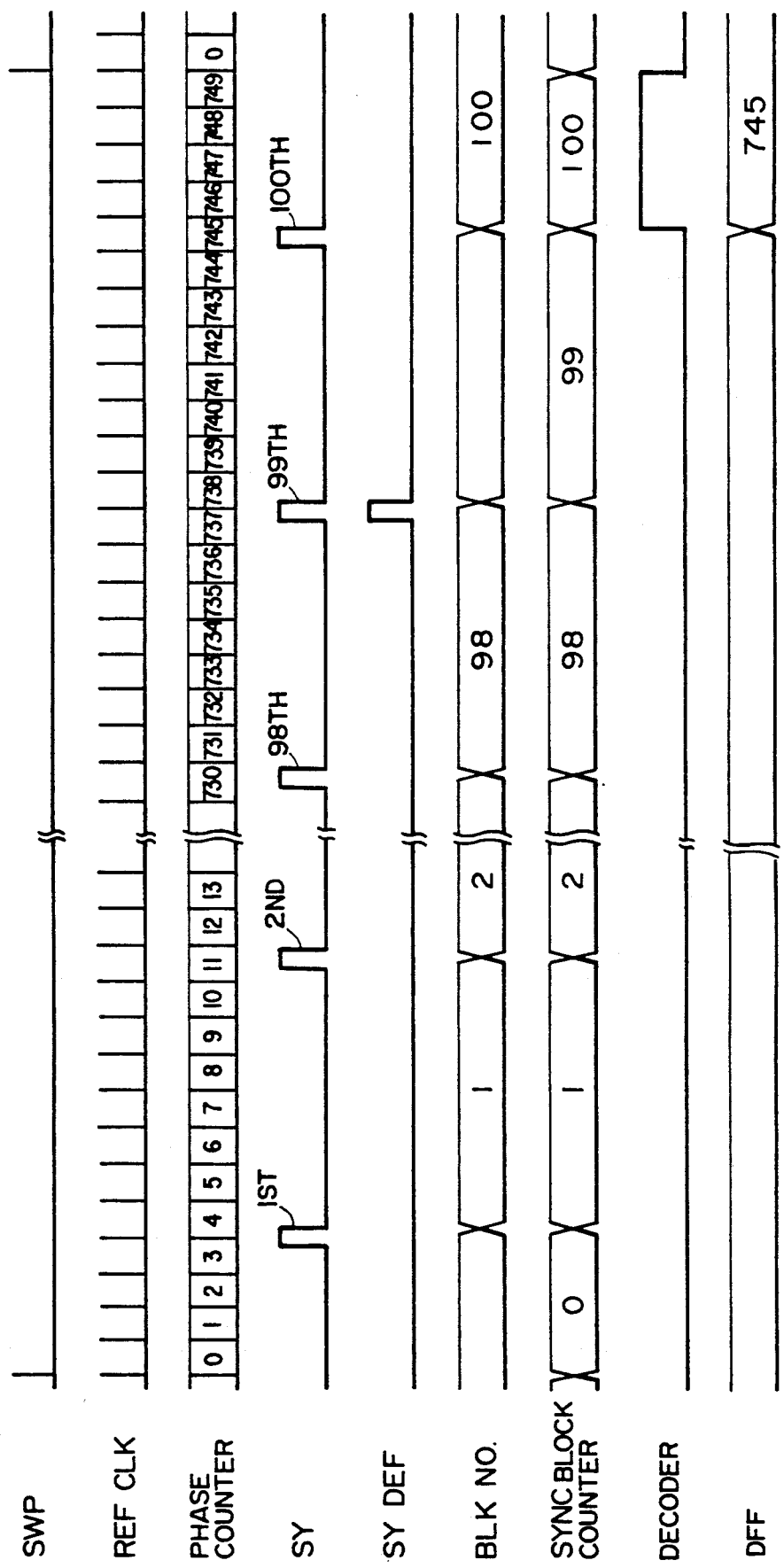
FIG. 5 is a diagram showing the relations of the timings of signals in respective sections of the circuit in FIG. 4.

FIGS. 4 and 5 show a construction of the sync phase detector 21 and the timing relation among the respective signals. The sync phase detector 21 comprises: a sync block counter 31; a decoder 32; a phase counter 33; and a D flip-flop 34. The sync block counter 31 is reset by a switching pulse SWP and counts up or loads the sync block number BLK No. synchronously with the sync detection signal SY. Such a function is changed by the defective sync signal SY DEF. When a pulse of the sync detection signal SY is produced and a pulse of the defective sync signal SY DEF is not produced, for example, as shown in FIG. 5 at the 1st, 2nd, 98th, and 100th pulses of the sync detection signal SY, the defective sync signal SY DEF is at the low level when the pulse of the sync detection signal SY is produced. Therefore, the sync block number BLK No. is loaded into the sync block counter 31. On the other hand, when a pulse of the sync detection signal SY is produced and a pulse of the defective sync signal SY DEF is also produced, for example, as shown in FIG. 5 at the 99th pulse of the sync detection signal SY, and the defective sync signal SY DEF rises earlier than the sync detection signal SY, the defective sync signal SY DEF is at the high level when the pulse of the sync detection signal SY is produced. Therefore, the sync block number BLK No. is not loaded into the sync block counter 31. However, the value of the sync block counter 31 is counted up by the sync detection signal SY. Thus, even if the sync detection of the digital reproduction signal cannot be fully executed, the value of the sync block number BLK No. is accurately held by the sync block counter 31 having such a function.

The decoder 32 decodes an output of a particular sync block number BLK No. in the output of the sync. block counter 31. In the above example, as shown in FIG. 5, when the 100th sync block number appears, the decoder 32 decodes it and produces an output.

The phase counter 33 is reset by the switching pulse SWP and the reference clock REF CLK is now then counted up. An output of the phase counter 33 is input to the D flip-flop 34. When the output of the decoder 32 rises, an output value of the phase counter 33 is held in the D flip-flop 34. The reproducing timing, with respect to the switching pulse SWP, of the 100th sync block number BLK No. is shown by the value held in the D flip-flop 34 (in FIG. 5, the value of 745 is shown). As a result of obtaining such a value, a deviation amount of the movable head is detected when the 100th sync block is detected.

In FIG. 1, reference numeral 22 denotes a movable head controller. The movable head controller 22 is constructed by a microcomputer and its peripheral devices. An output of the envelope detector 19, an output of the tape speed detecting circuit 20, an output of the sync phase detector 21, and a field track number FLD TRK No. output by the ID detecting circuit 16 are input to the controller 22. The field track number FLD TRK No. is information included in the ID signal and indicates the field and track to which the digital data belongs.

On the basis of the tape running speed, rotary magnetic head deviation amount, and scanning track field position information which are obtained from the above input signals, control signals are produced so that the rotary magnetic heads are scanned on six contiguous tracks corresponding to one field in a range where the rotary magnetic heads can be deviated. Further, the deviations of the rotary magnetic heads are controlled by the level of the reproduction signal envelope so that the rotary magnetic heads are scanned on a position near the center of the track. The control signals CONT produced by the movable head controller 22 as mentioned above are supplied to the deviating elements 8.

The explanation has been made above with respect to the construction in which the tape speed can be obtained by the frequency difference between the clock which is produced upon reproduction of the digital signal and the reference clock which is used upon recording of the digital signal. In particular, no problem occurs in the case where both of the recording and reproducing operations are executed by the same magnetic recording and reproducing apparatus. However, in the case where a magnetic tape recorded by one apparatus is reproduced by another apparatus different from the one apparatus, the clocks which are reproduced are not always identical due to a variation in recording reference clock frequencies of the apparatuses or the like. Therefore, by storing a difference in frequency between the reproduction clock when the signal is reproduced in the normal speed (standard speed) and the reference clock and considering the stored difference when comparing the clock which is produced in the variable speed reproducing mode and the reference clock, even more accurate tape speed information can be obtained.

FIG. 6 shows an embodiment of a construction of a circuit to correct the tape speed information for a recording tape on which the digital signal of a different recording rate is recorded.

Reference numerals 41 and 42 denote counters. The counters 41 and 42 count up the reproduction clock PB CLK and reference clock REF CLK and are reset by the switching pulse SWP, respectively. Reference numeral 43 denotes a subtracter for subtracting count values of the counters 41 and 42 and outputting the result of the subtraction. In the case where the magnetic tape which has been recorded by the same apparatus is reproduced in the normal speed (standard speed), the subtraction value which is output from the subtracter 43 is almost zero. However, when the magnetic tape of a different recording rate is reproduced at the normal speed, after the counters 41 and 42 are reset by the switching pulse SWP, the subtraction value is deviated from 0.

Reference numeral 44 denotes a switch. When the subtraction value is being stored in the normal speed mode, the switch 44 is connected to a terminal M shown in the diagram, and when the subtraction value is not being stored, the switch 44 is connected to a terminal V shown in the diagram, in response to a control signal NORMAL MEMORY. Reference numeral 45 denotes a memory. The subtraction value in the normal speed mode is written into the memory 45 at the period of the reference clock REF CLK. On the other hand, in the case where the subtraction value is not being stored, the subtraction value stored in memory 45 is read out in response to the reference clock REF CLK. Reference numeral 46 denotes a subtracter. In the variable speed reproducing mode or the like by the rotary magnetic heads, the subtracter 46 subtracts an output V of the switch 44 and an output of the memory 45 and more accurate tape speed information is output.

In the construction described as the above embodiment, the frequency change of the reproduction clock is used to obtain the tape speed information and the reproducing timing for a particular index signal is detected to obtain the deviation information of the rotary magnetic heads. However, in addition to the above method, in order to obtain the tape speed information, a construction of a combination of the method of using both of the control signal recorded on a linear track of a magnetic tape and an output of a capstan FG and a detecting method of a particular index signal as in the conventional techniques is also incorporated in the scope of the invention.

According to the invention, the control signal is unnecessary and if only the video signal is reproduced, the rotary magnetic head can be traced on the recording tracks at a high accuracy. Therefore, the control head is unnecessary, so that the construction of the apparatus is miniaturized and simplified. Even in the recording method in which the signal of one field is divided and recorded onto a plurality of tracks, the video signal can be reproduced on a field unit basis in a noiseless manner. Therefore, in the digital type magnetic recording and reproducing apparatus, the noiseless variable speed reproduction corresponding to the tape speed of a wide range can be executed by a simple small construction.

The present invention can be also embodied by other forms of the above embodiment without departing from the spirit or main features of the invention. Therefore, the above embodiment is nothing but one example of the invention with respect to all of the points and should not be limitedly interpreted. The scope of the invention is shown by the scope of claims for a patent. Further, all of modifications and variations belonging to the equivalent range of the scope of the claims for a patent are within the purview of the invention.

What is claimed is:

1. A magnetic reproducing apparatus comprising:
    a rotary cylinder having a rotary axis;
    a plurality of rotary magnetic heads disposed on the rotary cylinder for reproducing a digital signal recorded on a magnetic tape;
    rotary magnetic head position deviating means disposed on the rotary cylinder and responsive to position deviation control signals for deviating positions of the rotary magnetic heads in the direction of the rotary axis of the rotary cylinder by deviations corresponding to the position deviation control signals;
    digital signal processing means for processing the digital signal reproduced by the rotary magnetic heads to produce a reproduction clock signal;
    reference clock signal generating means for generating a reference clock signal;
    tape speed detecting means for comparing the reproduction clock signal with the reference clock signal and for producing a speed signal corresponding to a running speed of the magnetic ape on the basis of the comparison; and
    rotary magnetic head position deviation control means for producing the position deviation control signals on the basis of the speed signal produced by the tape speed detecting means.

2. A magnetic reproducing apparatus according to claim 1, wherein the digital signal is recorded on a plurality of tracks on the magnetic tape, each track including a plurality of sync blocks, each sync block including a sync signal having a predetermined signal pattern, an index signal, and video signal data, the index signal including a sync block number identifying the position of the sync block within the track, a field number identifying a field of the digital signal to which the video signal data belongs, the field corresponding to a plurality of the tracks, and a track number identifying the position of the track within the field.

3. A magnetic reproducing apparatus according to claim 1, wherein the tape speed detecting means comprises:
    comparing means for comparing the reproduction clock signal with the reference clock signal and for producing an output representing a difference between the reproduction clock signal and the reference clock signal;
    storing means for storing the output of the comparing means when the magnetic tape is running at a normal running speed; and
    means for producing the speed signal on the basis of the output of the comparing means and the output of the comparing means stored in the memory means, when the magnetic tape is running at a running speed other than the normal running speed.

4. A magnetic reproducing apparatus according to claim 1, wherein the apparatus does not include a control head for reproducing a control signal recorded in a longitudinal direction on the magnetic tape.

5. A magnetic reproducing apparatus according to claim 1, wherein the digital signal recorded on the magnetic tape does not include horizontal and vertical sync signals.

6. A magnetic reproducing apparatus according to claim 1, wherein the digital signal processing means produces the reproduction clock signal in synchronism with state changes in the digital signal reproduced by the rotary magnetic heads.

7. A magnetic reproducing apparatus comprising:
    a rotary cylinder having a rotary axis;
    a plurality of rotary magnetic heads disposed on the rotary cylinder for reproducing a digital signal recorded on a magnetic tape, the digital signal including index signals;
    rotary magnetic head position deviating means disposed on the rotary cylinder and responsive to position deviation control signals for deviating positions of the rotary magnetic heads in the direction of the rotary axis of the rotary cylinder by deviations corresponding to the position deviation control signals;
    digital signal processing means for processing the digital signal reproduced by the rotary magnetic heads to detect the index signals;
    particular index signal detecting means for detecting a particular index signal among the index signals detected by the digital signal processing means;
    means for generating a signal synchronized with rotation of the rotary cylinder;
    timing detecting means for detecting a timing at which the particular index signal detected by the particular index signal detecting means is reproduced by the rotary magnetic heads with respect to the signal synchronized with rotation of the rotary cylinder; and
    rotary magnetic head position deviation control means for producing the position deviation control signals on the basis of the timing detected by the timing detecting means.

8. A magnetic reproducing apparatus according to claim 7, wherein the digital signal is recorded on a plurality of tracks on the magnetic tape, each track including a plurality of sync blocks, each sync block including a sync signal having a predetermined signal pattern, an index signal, and video signal data, the index signal including a sync block number identifying the position of the sync block within the track, a field number identifying a field of the digital signal to which the video signal data belongs, the field corresponding to a plurality of the tracks, and a track number identifying the position of the track within the field.

9. A magnetic reproducing apparatus according to claim 7, wherein the digital signal is recorded on a plurality of tracks on the magnetic head, each track including a plurality of sync blocks, each sync block including a sync signal having a predetermined signal pattern and an index signal, the index signal including a sync block number identifying the position of the sync block within the track;
wherein the digital signal processing means detects the sync signals and the sync block numbers of the index signals; and
wherein the particular index signal detecting means comprises:
sync block number storing means for storing a current sync block number detected by the digital signal processing means when the digital signal processing means detects a current sync signal or incrementing a previously stored sync block number when the digital signal processing means does not detect a current sync signal, and for producing an output representing the stored sync block number; and
means for detecting when the output of the sync block number storing means represents a sync block number of the particular index signal.

10. A magnetic reproducing apparatus according to claim 7, wherein the apparatus does not include a control head for reproducing a control signal recorded in a longitudinal direction on the magnetic tape.

11. A magnetic reproducing apparatus according to claim 7, wherein the digital signal recorded on the magnetic tape does not include horizontal and vertical sync signals.

12. A magnetic reproducing apparatus comprising:
a rotary cylinder having a rotary axis;
a plurality of rotary magnetic heads disposed on the rotary cylinder for reproducing a digital signal recorded on a magnetic tape, the digital signal including index signals;
rotary magnetic head position deviating means disposed on the rotary cylinder and responsive to position deviation control signals for deviating positions of the rotary magnetic heads in the direction of the rotary axis of the rotary cylinder by deviations corresponding to the position deviation control signals;
digital signal processing means for processing the digital signal reproduced by the rotary magnetic heads to produce a reproduction clock signal and to detect the index signals;
reference clock signal generating means for generating a reference clock signal;
tape speed detecting means for comparing the reproduction clock signal with the reference clock signal and for producing a speed signal corresponding to a running speed of the magnetic tape of the basis of the comparison;
particular index signal detecting means for detecting a particular index signal among the index signals detected by the digital signal processing means;
means for generating a signal synchronized with rotation of the rotary cylinder;
timing detecting means for detecting a timing at which the particular index signal detected by the particular index signal detecting means is reproduced by the rotary magnetic heads with respect to the signal synchronized with rotation of the rotary cylinder; and
rotary magnetic head position deviation control means for producing the position deviation control signals on the basis of the speed signal produced by the tape speed detecting means and the timing detected by the timing detecting means.

13. A magnetic reproducing apparatus according to claim 12, wherein the digital signal is recorded on a plurality of tracks on the magnetic tape, each track including a plurality of sync blocks, each sync block including a sync signal having a predetermined signal pattern, an index signal, and video signal data, the index signal including a sync block number identifying the position of the sync block within the track, a field number identifying a field of the digital signal to which the video signal data belongs, the field corresponding to a plurality of the tracks, and a track number identifying the position of the track within the field.

14. A magnetic reproducing apparatus according to claim 12, wherein the apparatus does not include a control head for reproducing a control signal recorded in a longitudinal direction on the magnetic tape.

15. A magnetic reproducing apparatus according to claim 12, wherein the digital signal recorded on the magnetic tape does not include horizontal and vertical sync signals.

16. A magnetic reproducing apparatus according to claim 12, wherein the digital signal processing means produces the reproduction clock signal in synchronism with state changes in the digital signal reproduced by the rotary magnetic heads.

* * * * *